(12) United States Patent
Asakura (10) Patent No.: US 10,942,383 B2
(45) Date of Patent: Mar. 9, 2021

(54) DISPLAY DEVICE

(71) Applicant: TIANMA JAPAN, LTD., Kanagawa (JP)

(72) Inventor: Tetsuroh Asakura, Kawasaki (JP)

(73) Assignee: TIANMA JAPAN, LTD., Kanagawa (JP)

(*) Notice: Subject to any disclaimer, the term of this patent is extended or adjusted under 35 U.S.C. 154(b) by 0 days.

(21) Appl. No.: 16/535,783

(22) Filed: Aug. 8, 2019

(65) Prior Publication Data
US 2020/0050056 A1 Feb. 13, 2020

(30) Foreign Application Priority Data

Aug. 9, 2018 (JP) .............................. JP2018-150439

(51) Int. Cl.
*G02F 1/1333* (2006.01)
*G02F 1/1335* (2006.01)

(52) U.S. Cl.
CPC .... *G02F 1/133308* (2013.01); *G02F 1/13338* (2013.01); *G02F 1/133305* (2013.01); *G02F 1/133528* (2013.01); *G02F 2001/133314* (2013.01); *G02F 2001/133322* (2013.01); *G02F 2001/133331* (2013.01)

(58) Field of Classification Search
CPC ......... G02F 1/133305; G02F 1/133308; G02F 2001/133314; G02F 2001/133317; G02F 2001/133322; G02F 1/133528; G02F 2001/133331; H01L 51/0097; H01L 2251/5338; G09F 9/301; G02B 5/3025
See application file for complete search history.

(56) References Cited

U.S. PATENT DOCUMENTS

| | | | | |
|---|---|---|---|---|
| 2009/0290113 A1* | 11/2009 | Nakahata | ............ | B32B 38/1866 349/138 |
| 2012/0020056 A1* | 1/2012 | Yamagata | ......... | G02F 1/133308 362/97.1 |
| 2014/0118910 A1* | 5/2014 | Sung | .................. | G02F 1/133305 361/679.01 |
| 2016/0291391 A1* | 10/2016 | Yoshida | ............ | G02F 1/133308 |
| 2017/0153485 A1* | 6/2017 | Kim | ....................... | G02F 1/1339 |

FOREIGN PATENT DOCUMENTS

JP        2011-085740 A        4/2011

* cited by examiner

*Primary Examiner* — Jia X Pan
(74) *Attorney, Agent, or Firm* — Sughrue Mion, PLLC (57) ABSTRACT

A display device includes: a liquid crystal panel having a first surface including a display region and a second surface opposite to the first surface, as curved surfaces curved in a first direction; a contact member attached to the second surface; a pressure member attached to the contact member, and applying a pressing force to the panel, the pressing force countering an elastic force acting to restore the panel as a flat plate; and a fixing chassis fixing the pressure member at a position opposing the contact member; the panel includes a seal tracing an inner circumference of the curved surface and sealing liquid crystal, and a contact region between the contact member and the panel is located inside the seal along a third axis being perpendicular to a first axis defining a non-curved side of the curved surface, and to a second axis defining the first direction.

11 Claims, 7 Drawing Sheets

DISPLAY DEVICE

CROSS-REFERENCE TO RELATED APPLICATION

This Non-provisional application claims priority under 35 U.S.C. § 119(a) on Patent Application No. 2018-150439 filed in Japan on Aug. 9, 2018, the entire contents of which is hereby incorporated by reference.

BACKGROUND

The present disclosure relates to a display device.

Display devices that have a shape fitting the devices on which they are installed or locations in which they are placed are sought after. To meet such demands, a curved display in which the display surface has a curved shape so as to integrate with the outer shape of the case is proposed, for example. Curved displays are used in trains, vehicles, and the like.

In order to realize a curved display, the substrates of the display panel need to be flexible. Glass substrates are used in liquid crystal displays, which are widely used as display panels, and while glass substrates have a low rate of expansion and have excellent durability against heat and chemicals, glass substrates are hard, which means they are unsuited for use in curved displays. According to a glass substrate having a thickness of about 0.2 mm or less, it is said that curving is possible by giving flexibility.

However, glass substrates in a curved display are continuously subjected to tensile or compressive stress as a result of being curved, which poses the risk of defects such as uneven display in the vicinity of non-curved sides or separation of bonded components. In order to deal with this situation, a structure is sought in which the display panel is kept in a curved state against the elastic force of the display panel that acts to restore the display panel to a flat shape.

JP 2011-85740 A (Patent Document 1) discloses a technique in which a display panel with a curved shape is provided, on the rear side opposite to the display surface, with a rear support substrate that supports the vicinity of the ends of the non-curved sides of the liquid crystal panel, and the rear support substrate 332 has a floating portion facing the ends of the non-curved sides of the liquid crystal panel in the vicinity of the ends of the non-curved sides of the liquid crystal panel, the floating portion not touching the ends of the non-curved sides.

SUMMARY OF THE INVENTION

However, in the technique disclosed in Patent Document 1, the rear support substrate is a structure that continuously applies a pressing force on the liquid crystal panel, but the pressing force is applied within the display screen of the liquid crystal panel. Thus, uniform contact is sought between the rear support substrate and the contacted surface of the liquid crystal panel.

However, if the environment changes to that of high temperature, high humidity, or the like, changes in the dimensions and elastic modulus of the rear support substrate would result in a situation in which uniform contact cannot be ensured. This results in localized differences in pressure on the display screen of the liquid crystal panel, causing variations in the gap between the color filter substrate and the array substrate. Members constituting the liquid crystal panel such as the polarizing plates are similarly subjected to unwanted forces. As a result, there is a risk of defects such as uneven display as a result of strong localized forces.

In order to solve the above problem, the present disclosure adopts the following construction. A display device, includes: a liquid crystal panel having a first surface including a display region and a second surface opposite to the first surface, as curved surfaces that are curved in a first direction; a contact member that is attached to the second surface of the liquid crystal panel; a pressure member that is attached to the contact member, and applies a pressing force to the liquid crystal panel, the pressing force countering an elastic force that acts to restore the liquid crystal panel as a flat plate; a fixing chassis that fixes the pressure member at a position opposing the contact member; and a support member that supports the fixing chassis, wherein the liquid crystal panel includes a seal that traces an inner circumference of the curved surface and seals liquid crystal, and wherein a contact region between the contact member and the liquid crystal panel is located inside of the seal along a third axis that is perpendicular to a first axis that defines a non-curved side of the curved surface, and to a second axis that defines the first direction.

It is to be understood that both the foregoing general description and the following detailed description are exemplary and explanatory and are not restrictive of this disclosure.

BRIEF DESCRIPTION OF THE DRAWINGS

The present disclosure can be appreciated by the description which follows in conjunction with the following figures, wherein.

DETAILED DESCRIPTION OF THE PREFERRED EMBODIMENTS

Hereinafter, embodiments are described with reference to the accompanying drawings. It should be noted that the embodiments are merely examples to implement this disclosure and are not to limit the technical scope of this disclosure. Elements common to the drawings are denoted by the same reference signs. Elements in the drawings may not be consistent with the actual size or proportion.

Embodiment 1

Figure 1:
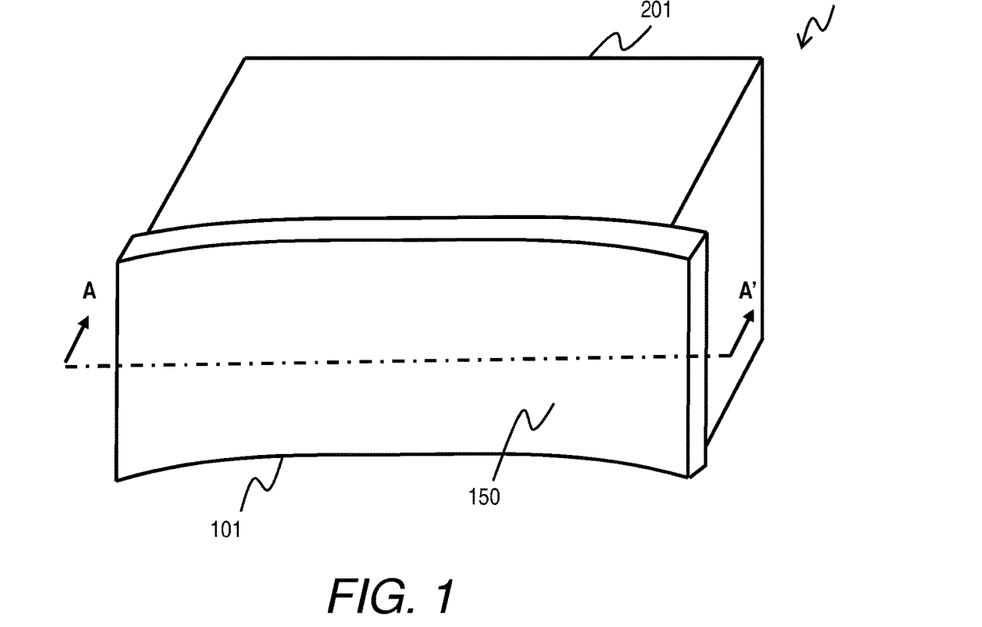
FIG. 1 is a perspective view of an example of a display device according to the following embodiments.

FIG. 1 is a perspective view of an example of a display device. The display device 10 includes a front cover 101 and a backlight chassis 201, for example. The backlight chassis 201 is a stainless steel container of a prescribed shape having an opening, for example. In the example of FIG. 1, the backlight chassis 201 is a rectangular cuboid container, with an opening formed by one surface being absent. The front cover 101 is a glass plate or a molded resin plate that is layered onto the backlight chassis 201 so as to cover the opening of the backlight chassis 201, for example.

The backlight chassis 201 is fixed to the surface of the front cover 101 opposite to the surface 150. The surface 150 is the surface of the front cover 101 on the display surface side where images are displayed. The surface 150 and the surface opposite thereto of the front cover 101 have a shape that curves towards the direction where the backlight chassis 201 is present, for example.

Figure 2:
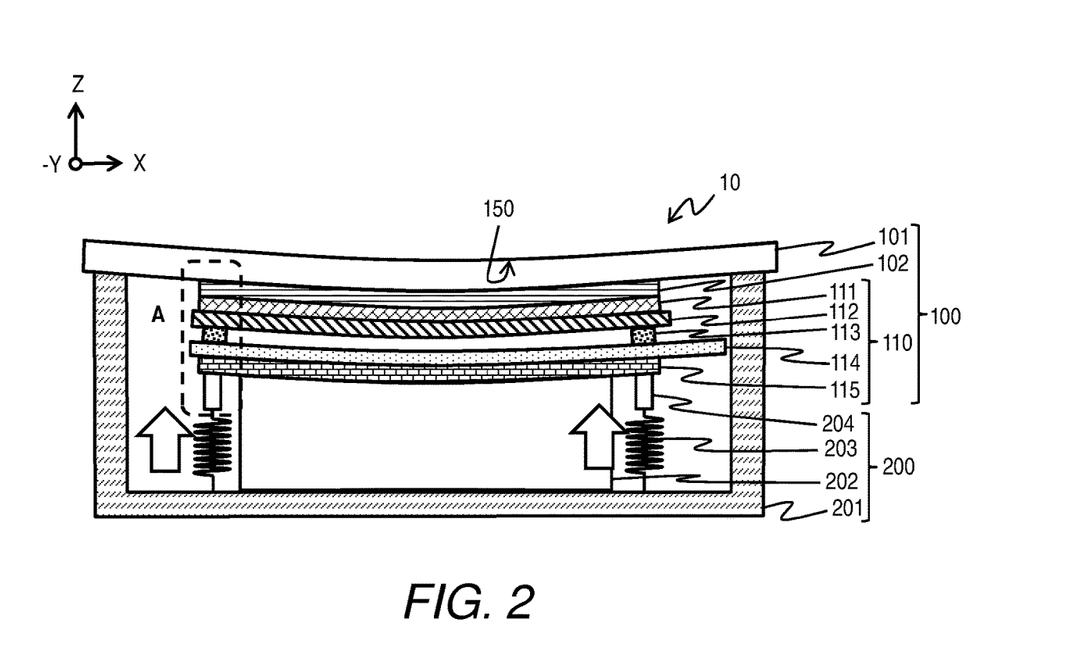
FIG. 2 is a cross-sectional view illustrating an example of cross section of the display device along the line A-A' of FIG. 1 according to Embodiment 1.

FIG. 2 is a cross-sectional view illustrating an example of cross section of the display device 10 along the line A-A' of FIG. 1. The display device 10 includes a front unit 100 and a rear unit 200. The front unit 100 includes the front cover 101, a first adhesive layer 102, and a liquid crystal panel 110, for example. The liquid crystal panel 110 includes a color filter (CF) polarizing plate 111, a CF substrate 112, a seal 113, a thin film transistor (TFT) substrate 114, and a TFT polarizing plate 115.

The rear unit 200 includes the backlight chassis 201, a backlight unit 202, one or more pressure members 203, and one or more contact members 204, for example. The members of the front unit 100 aside from the front cover 101 and the members of the rear unit 200 aside from the backlight chassis 201 are accommodated in the backlight chassis 201.

Below, the direction in which the backlight chassis 201 and the front cover 101 are layered is designated as the Z axis direction (upward direction in FIG. 2), the plane perpendicular to the Z axis is designated as the XY plane, one of the longer side directions of the bottom surface of the backlight chassis 201 (right direction in FIG. 2) is designated as the X axis direction, and one of the shorter side directions of the bottom surface of the backlight chassis 201 (depth direction in FIG. 2) is designated as the Y axis direction. The surface positioned on the positive Z axis direction side of the front cover 101 is the display surface of the display device 10. The positive Z axis direction is also referred to as the upward direction, the negative Z axis direction as the downward direction, the positive X axis direction as the right direction, and the negative X axis direction as the left direction.

The front cover 101 is a structure with a curved shape and having a high degree of rigidity that forms the curved shape of the liquid crystal panel 110. The front cover 101 is layered on the liquid crystal panel 110 via the first adhesive layer 102. In other words, the non-display surface side of the front cover 101 (surface opposite the surface including the display surface) and the liquid crystal panel 110 are bonded to each other by the first adhesive layer 102. An optical clear adhesive (OCA) film is used as the first adhesive layer 102, for example. The first adhesive layer 102 is layered on the CF polarizing plate 111 of the liquid crystal panel 110.

The liquid crystal panel 110 is bonded to the front cover 101, which has a high degree of rigidity, and the substrates and polarizing plates included in the liquid crystal panel 110 have a curved shape that follows the front cover 101. Similar to the front cover 101, the substrates and the polarizing plates have a shape formed by curving the surfaces parallel to the XY plane of the rectangular cuboid (cubes are included as a type of rectangular cuboid) having a bottom surface parallel to the XY plane, the substrates and polarizing plates being curved such that the central portions in the X axis direction protrude more towards the negative Z axis direction.

In other words, the cross sections along a plane parallel to the ZX plane of the substrates and the polarizing plates have curved sides for the sides parallel to the X axis direction of the rectangle (or square), and non-curved sides for the sides parallel to the Y axis direction. In other words, the surfaces of the substrates and the polarizing plates parallel to the YZ plane are rectangles (or squares) constituted only of non-curved sides. Overall, the display surface including the display region of the liquid crystal panel 110 and the non-display surface opposite to the display surface are curved in the negative Z axis direction.

The CF polarizing plate 111 is layered onto the CF substrate 112. The CF substrate 112 is layered on the seal 113. The seal 113 is layered on the TFT substrate 114. The seal 113 has a frame shape, for example, and the outer frame thereof traces the inner circumference of the outer frames of the TFT substrate 114 and the CF substrate 112. Liquid crystal fills the gap between the CF substrate 112 and the TFT substrate 114, and the liquid crystal is sealed in by the seal 113. The TFT substrate 114 is layered onto the TFT polarizing plate 115.

The liquid crystal panel 110 is disposed on the backlight unit 202. Specifically, the TFT polarizing plate 115 is layered on the top surface of the backlight unit 202. The TFT polarizing plate 115 and the backlight unit 202 are in contact with each other but not joined to each other.

A portion of the TFT polarizing plate 115 protrudes beyond the top surface of the backlight unit 202 in the XY plane, and in the protruding portion, the bottom surface of the TFT polarizing plate 115 is in contact with the contact members 204. The contact members 204 are made of rubber or a resin, for example. As previously mentioned, the surface of the contact member 204 in the positive Z axis direction is in contact with the TFT polarizing plate 115, and the surface opposite thereto is joined to the pressure members 203. The contact members 204 are formed along the seal 113 in the Y axis direction. In other words, the contact members 204 are positioned in the vicinity of the ends of the curved sides of the TFT substrate 114 and trace the inner circumference of the non-curved sides.

The contact members 204 may have a structure that contacts the TFT substrate 114. Specifically, if the end of the TFT polarizing plate 115 in the X axis direction is positioned to the inside of the seal 113, the contact members 204 contacts the TFT substrate 114.

The pressure members 203 are also joined to the bottom surface of the backlight chassis 201. The pressure members 203 are compression coil springs that are compressed to a degree that allows for an appropriate pressing force (counterforce), for example. The pressure members 203 may be another type of member that applies pressure (compressed elastomers represented by examples such as natural or synthetic rubber, or spring materials such as plate springs or disc springs made of a metal or non-metal, for example).

In the present embodiment, the backlight chassis 201 functions as a fixing chassis that fixes the pressure members 203 in place, and the front cover 101 functions as a support plate that supports the backlight chassis 201, which is the fixing chassis. It is preferable that the support plate have a high degree of rigidity. At least either one of the CF polarizing plate 111 and the TFT polarizing plate 115 may be omitted from the display device 10.

The arrows in FIG. 2 indicate the direction of the pressing force by the pressure members 203. The pressure members 203 are positioned between the backlight chassis 201 and the contact members 204, and apply the pressing force to the liquid crystal panel 110 via the contact members 204. The material of the pressure members and the compression width are determined such that the magnitude of the pressing force cancels out the elastic force (deformation load) that acts to cause the liquid crystal panel 110 to be restored from its curved shape to a flat shape. Specifically, it is preferable that the pressing force be greater than or equal to the elastic force.

The backlight unit 202 includes a backlight, and is located at the center of the bottom surface of the backlight chassis 201, for example. The backlight unit 202 includes, for example, a light guide plate, optical films, and a lamp. The pressure members 203 are disposed along the circumference of the backlight unit 202 in the XY plane.

The backlight chassis 201 accommodates components of the front unit 100 excluding the front cover 101, the backlight unit 202, the pressure members 203, and the contact members 204. The backlight chassis 201 is joined to the front cover 101. Also, the backlight chassis 201 serves as a framework that supports the components of the rear unit 200 excluding the backlight chassis 201. Here, the backlight chassis 201 is joined to the front cover 101, but as long as an appropriate position can be ensured for the backlight unit 202 in relation to the display surface of the liquid crystal panel 110, the backlight chassis 201 may be joined to another structure of the liquid crystal panel 110.

In manufacturing the display device 10 of the present embodiment, the front unit 100 and the rear unit 200 are assembled separately, and the rear unit 200 is bonded to the front unit 100 by being pressed thereto, for example.

Figure 3:
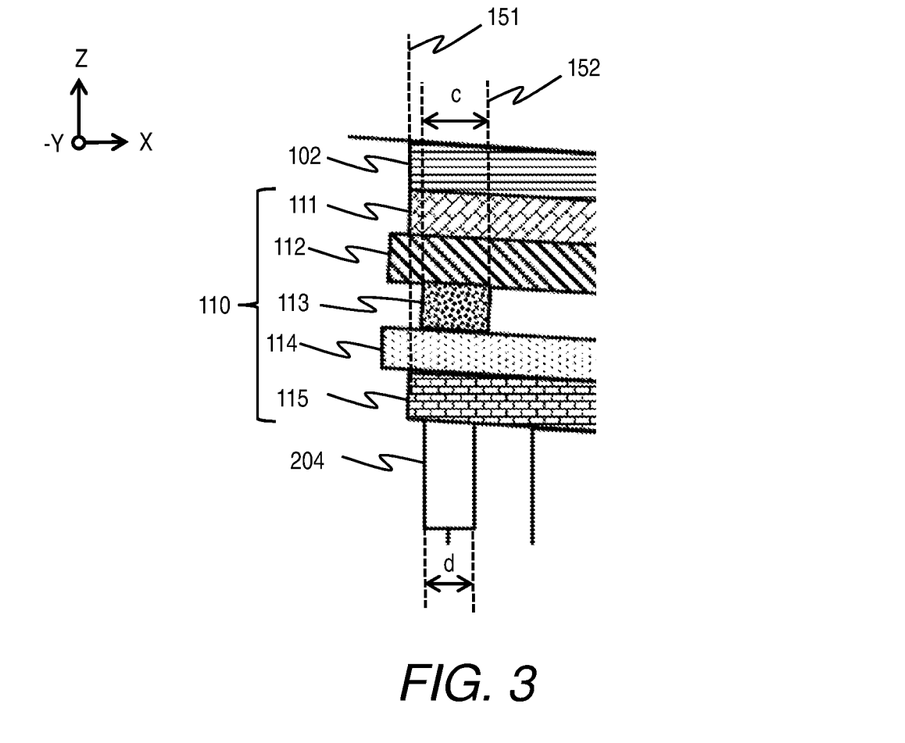
FIG. 3 illustrates a partial expanded view of an example of section A in FIG. 2.

FIG. 3 illustrates a partial expanded view of an example of section A in FIG. 2. The dotted line 151 indicates the edge in the negative X axis direction of the first adhesive layer 102, the CF polarizing plate 111, and the TFT polarizing plate 115. The dotted line 152 indicates the inner circumferential edge of the seal 113. The edge indicated by the dotted line 151 is located further to the outside than the inner circumferential edge of the seal 113 in relation to the center of the screen of the liquid crystal panel 110. A width c of the seal 113 is 1 mm to 3 mm. Here, the width is along an axis perpendicular to the axis (Y axis) defined by the non-curved side and the axis (Z axis direction) towards in which the curved surface is curved, or in other words, the X axis.

A contact width d between the contact member 204 and the TFT polarizing plate 115 is less than or equal to the width c of the seal 113. Also, the contact position between the contact member 204 and the TFT polarizing plate 115 is within the range of the seal width c (including outer circumference of seal 113). In other words, the seal 113 is present along the positive Z axis direction at a given point within the contact region between the contact member 204 and the TFT polarizing plate 115 (i.e., the contact region between the contact member 204 and the TFT polarizing plate 115 along the X axis is located to the inside of the seal 113).

Also, the length of the contact member 204 in the Y axis direction is the same or substantially the same as the length in the Y axis direction of the seal 113, for example. By the configuration described with reference to FIG. 3, the pressing force by the pressure members 203 is transmitted to the front cover 101 via the liquid crystal panel 110. Along the positive Z axis direction of the contact member 204, at least the front cover 101, the first adhesive layer 102, the CF substrate 112, and the TFT substrate 114 are disposed.

Figure 4:
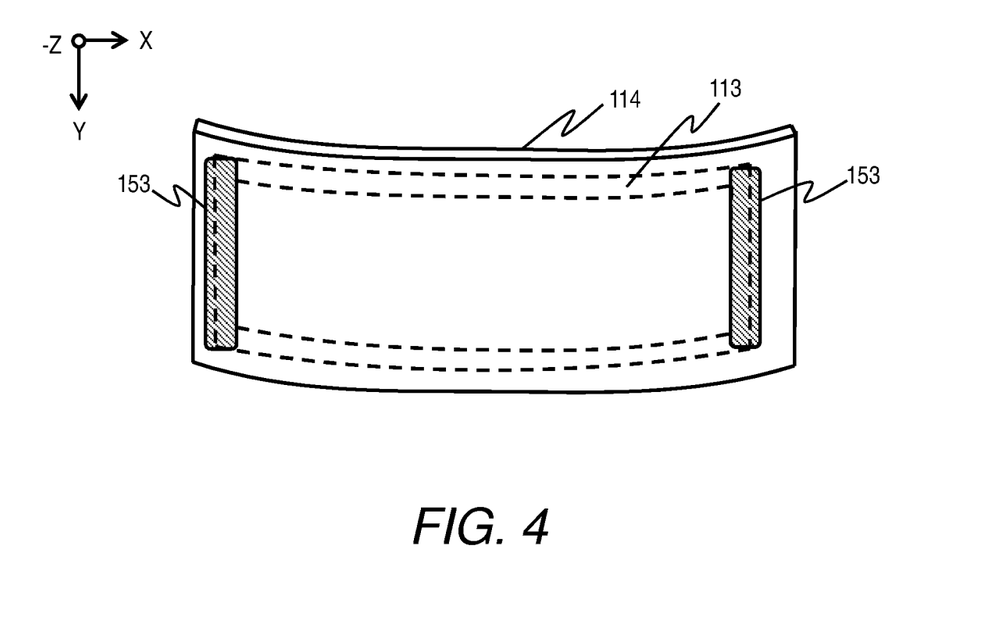
FIG. 4 is a schematic view illustrating an example of a position of a seal and contact members where a TFT substrate is viewed from the rear (i.e., the negative Z axis direction) according to Embodiment 1.

FIG. 4 is a schematic view illustrating an example of a position of the seal 113 and the contact members 204 where the TFT substrate 114 is viewed from the rear (i.e., the negative Z axis direction). The seal 113 has a frame shape as previously mentioned, and is disposed on the far side of the TFT substrate 114 in a front view of FIG. 4. Also, the regions 153 are where the contact regions between the contact members 204 and the TFT polarizing plate 115 are projected in the Z axis direction.

The elastic force that acts on the liquid crystal panel 110 to restore it from a curved shape to a flat shape acts in the negative Z axis direction in the regions 153. Accordingly, by the positive Z axis direction pressing force from the pressure members 203 being applied evenly across the Y axis direction on the regions 153, the liquid crystal panel 110 can be kept in a curved state.

The regions 153 are also regions where the CF substrate 112 and the TFT substrate 114 are joined to each other by the seal 113, and thus, the region 153 is the highest rigidity region in the Z axis direction in the liquid crystal panel 110. It is preferable that the contact members 204 be arranged in a manner that the pressing force by the pressure members 203 is applied to only the regions 153 within the TFT substrate 114. This prevents deformation by the pressing force on the CF substrate 112 and the TFT substrate 114 of the liquid crystal panel 110.

Additionally, the bonding positions (outer dimensions) of the first adhesive layer 102, the CF polarizing plate 111, and the TFT polarizing plate 115 are located to the outside of the inner circumference of the seal 113, and by covering the seal 113, the pressing force acts towards the front cover 101 in the Z axis direction.

By the aforementioned pressing force, the liquid crystal panel 110 can be kept in a curved state. Also, the pressing force on the contact members 204 does not act as stress to bend the members constituting the liquid crystal panel 110, the first adhesive layer 102, or the like, and thus, it is possible to mitigate the occurrence of uneven display resulting from localized pressure in the vicinity of the contact regions of the contact members 204 (vicinity of edges in the Y axis direction).

Figure 5:
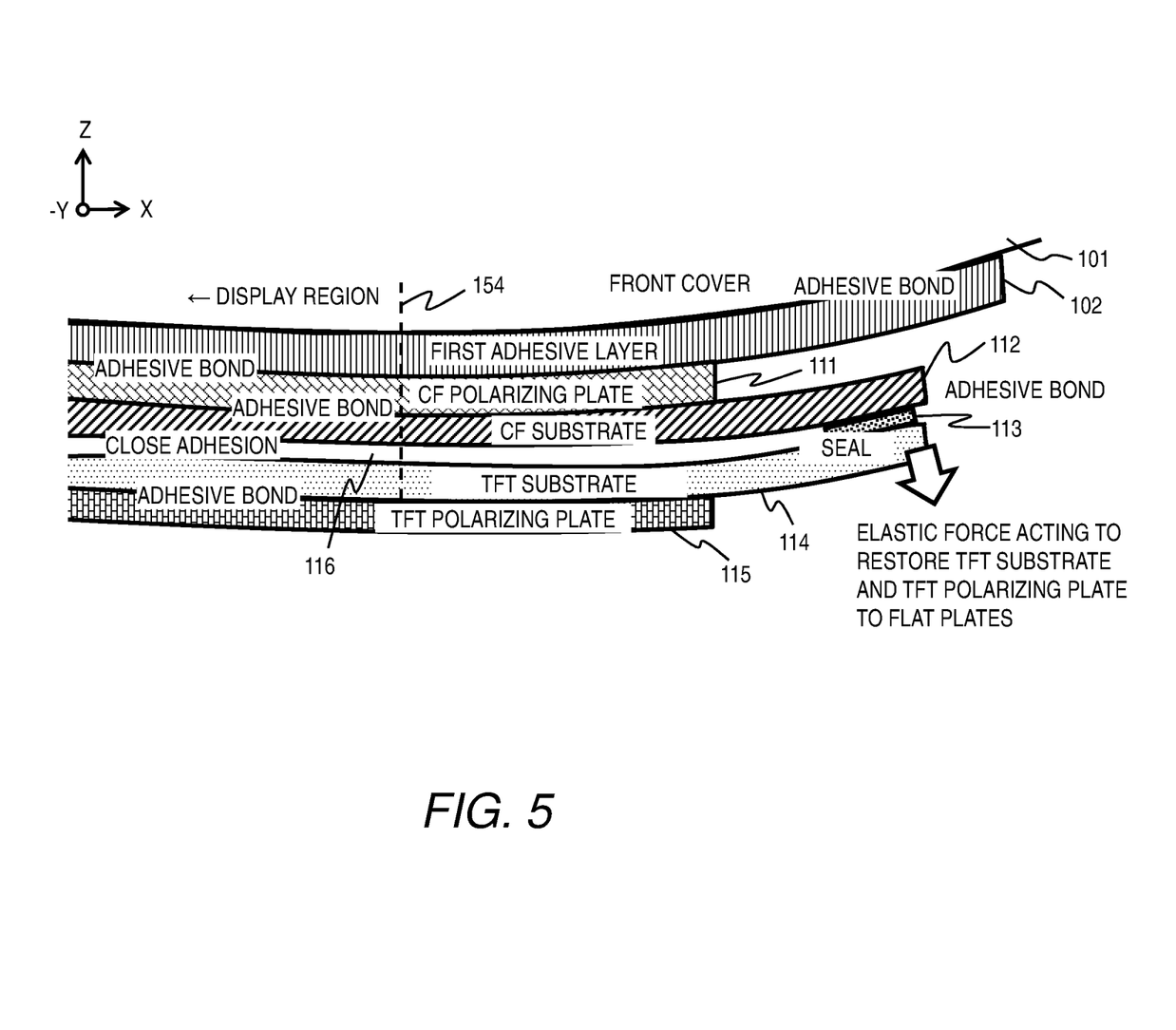
FIG. 5 is a partial cross-sectional view illustrating one example of a liquid crystal panel in a simulation model for elastic force that acts to restore the liquid crystal panel to a flat shape according to Embodiment 1.

FIG. 5 is a partial cross-sectional view illustrating one example of the liquid crystal panel 110 in a simulation model for elastic force that acts to restore the liquid crystal panel 110 to a flat shape. The front cover 101 and the first adhesive layer 102 are bonded to each other. However, the simulation to be described later was performed under the assumption that the first adhesive layer 102 is absent. The first adhesive layer 102 is bonded to the CF polarizing plate 111. The CF polarizing plate 111 is bonded to the CF substrate 112.

The dotted line 154 indicates the boundary between the display region for images in the display surface and the non-display region, and the area to the inside (negative X axis direction in FIG. 5) of the dotted line 154 is the display region while the area to the outside thereof is the non-display region. The distance in the X axis direction between the display surface and the seal 113 is 3 mm to 6 mm, for example.

FIG. 5 does not illustrate the contact members 204, but the contact members 204 are entirely located outside of the display region in the XY plane. In other words, the contact members 204 are not located in the optical path of the light emitted to the liquid crystal from the backlight unit 202. Thus, the pressing force by the pressure members 203 primarily acts not in the display region but towards the positive Z axis direction of the contact members 204, and no differential in pressing force occurs in the display region, which mitigates the occurrence of uneven display.

The CF substrate 112 is bonded to the TFT substrate 114 through the seal 113 in the non-display region. The CF substrate 112 is closely adhered to the TFT substrate 114 through an in-screen spacer member 116 in the display region. The in-screen spacer member 116 includes a liquid crystal layer (liquid) and a spacer member (not bonded to the TFT surface). The TFT substrate 114 is bonded to the TFT polarizing plate 115.

It is preferable that the liquid crystal layer and the spacer member included in the in-screen spacer member 116 be a softer member (with a lower Young's modulus) than the seal 113. There exists an elastic force as internal stress that acts to restore the TFT substrate 114 and the TFT polarizing plate 115 from curved plates to flat plates, and the elastic force is always acting on the TFT substrate 114 and the TFT polarizing plate 115.

If the elastic force acts on the seal 113 and in the display region, the seal 113 is bonded to the CF substrate 112, and thus, while there would be little change in the external appearance of the TFT substrate 114 and the TFT polarizing plate 115, there would be a large amount of change in the front of the TFT substrate 114 in the display region. Below, simulation results indicating how displacement (deformation) appears in the in-screen spacer member 116 as a result of stress on the edges in the X axis direction of the TFT substrate 114, as a representation of the elastic force, will be described.

Figure 6:
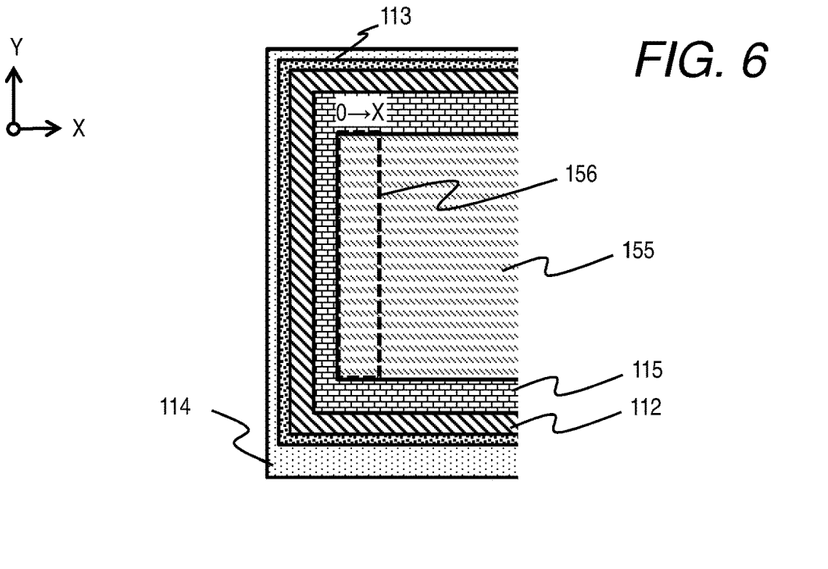
FIG. 6 is a plan view illustrating an example of the liquid crystal panel of the display device of FIG. 5.

FIG. 6 is a plan view illustrating an example of the liquid crystal panel 110 of the display device 10 of FIG. 5. FIG. 6 illustrates the left half (half in the negative X axis direction) of the liquid crystal panel 110. The display region 155 is a region for displaying images in the TFT substrate 114. The region 156 is the edge in the negative X axis direction of the display region 155.

Figure 7:
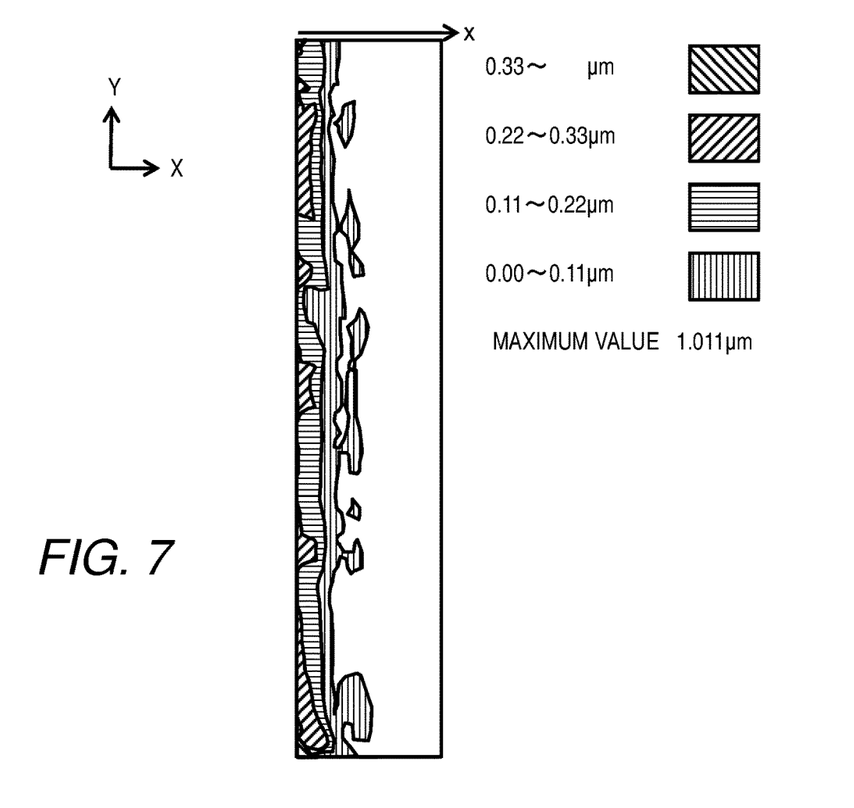
FIG. 7 is a descriptive view illustrating one example of simulation results for an elastic force that acts to restore the liquid crystal panel to a flat shape when there is no pressing force by the pressure member according to Embodiment 1.

FIG. 7 is a descriptive view illustrating one example of simulation results for an elastic force that acts to restore the liquid crystal panel 110 to a flat shape when there is no pressing force by the pressure member 203. In the example of FIG. 7, simulation results are illustrated indicating the deformation amount of the region 156 in the display region 155 of the TFT substrate 114 resulting from the elastic force, which acts to restore the curved TFT substrate 114 and the TFT polarizing plate 115 to flat plates, acting on the seal 113.

The deformation amount is greater on the left side of the region 156 (i.e., the negative X axis direction), and the left edge of the region 156 (i.e., the edge of the display region 155 in the negative X axis direction) is overall deformed by 0.3 μm. The maximum deformation amount in the region 156 is 1.011 μm.

Figure 8:
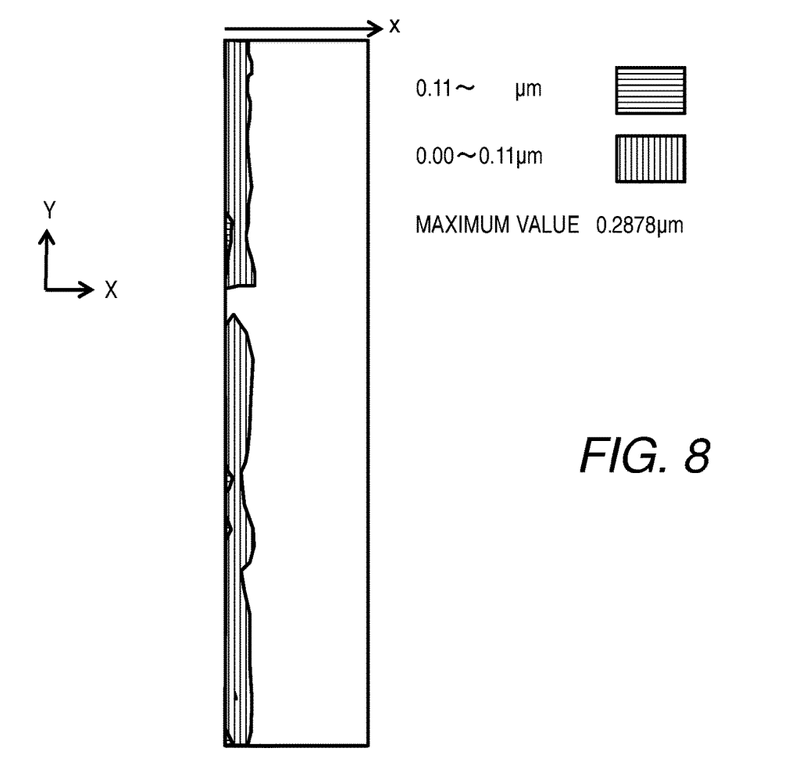
FIG. 8 is a descriptive view illustrating one example of simulation results of an elastic force that acts to restore the liquid crystal panel to a flat plate when a pressing force by the pressure members is present according to Embodiment 1.

FIG. 8 is a descriptive view illustrating one example of simulation results of an elastic force that acts to restore the liquid crystal panel 110 to a flat plate when a pressing force by the pressure members 203 is present. The pressing force is assumed to be the same as the aforementioned elastic force. Deformation is found towards the left of the region 156, but the area that is deformed and the deformation amount are both less than in the simulation results of FIG. 7. The deformation amount is 0.11 μm or less in almost all deformed locations. Also, the maximum deformation amount of the region 156 is 0.2878 μm, which is less than in the simulation results of FIG. 7.

As described above, in the display device 10 of the present embodiment, the pressure members 203 apply a pressing force that cancels out the elastic force (deformation load) that acts to restore the liquid crystal panel 110 from a curved shape to a flat shape, enabling the liquid crystal panel 110 to maintain its curved shape and additionally mitigating the occurrence of uneven display in the liquid crystal panel 110.

In the present embodiment, an example was described in which the front cover 101, the first adhesive layer 102, and the liquid crystal panel 110 are curved in the negative Z axis direction, but the front cover 101, the first adhesive layer 102, and the liquid crystal panel 110 may be curved in the positive Z axis direction. However, in such a case, the elastic force on the front cover 101, the first adhesive layer 102, and the liquid crystal panel 110 acts in the positive Z axis direction, and thus, the pressing force by the pressure members 203 needs to act in the negative Z axis direction. Specifically, if the pressure members 203 are springs, the pressure members 203 need to be fixed in a state of being stretched.

Also, in the present embodiment, an example was described in which the front cover 101, the first adhesive layer 102, and the liquid crystal panel 110 are curved in the negative Z axis direction so as to protrude further in the central portion in the X axis direction, but the front cover 101, the first adhesive layer 102, and the liquid crystal panel 110 may be curved in the positive (or negative) Z axis direction so as to protrude further at the edges in the X or Y axis direction. Specifically, a partial curved shape may be adopted in which the front cover 101, the first adhesive layer 102, and the liquid crystal panel 110 are flat up to an intermediate position along the positive X axis direction from the negative X axis direction edge but gradually curve in the positive Z axis direction from that intermediate position to the positive X axis direction edge, for example. In such a case, the pressure member 203 and the contact member 204 may be provided only at the non-curved edge of the curved side (i.e., the positive X axis direction edge).

Embodiment 2

Figure 9:
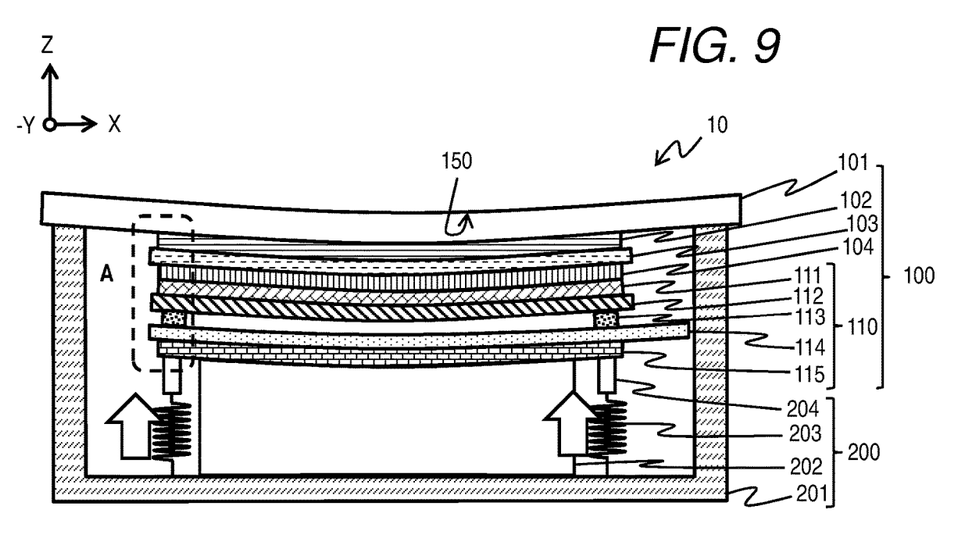
FIG. 9 is a cross-sectional view illustrating an example of cross section of the display device 10 along the line A-A' of FIG. 1 according to Embodiment 2.

Differences from the display device 10 of Embodiment 1 will be described. The display device 10 of the present embodiment includes a touch panel sensor. FIG. 9 is a cross-sectional view illustrating an example of cross section of the display device 10 along the line A-A' of FIG. 1. The front unit 100 includes a touch panel sensor 103 and a second adhesive layer 104 that are accommodated in the backlight chassis 201.

The touch panel sensor 103 is interposed between the front cover 101 and the liquid crystal panel 110, and is bonded to the front cover 101 by a first adhesive layer 102. The second adhesive layer 104 bonds the touch panel sensor 103 to the CF polarizing plate 111 of the liquid crystal panel 110. An OCA is used as the second adhesive layer 104, for example. The edges of the touch panel sensor 103 in the XY plane of the active sensor region are positioned outside of the display region of the liquid crystal panel 110 in the XY plane, for example.

The touch panel sensor 103 has a similar curved shape to the liquid crystal panel 110. That is, the touch panel sensor 103 also has acting thereon an elastic force to restore the touch panel sensor 103 to a flat shape, similar to the liquid crystal panel 110. Therefore, it is preferable that the magnitude of the pressing force by the pressure members 203 cancel out the elastic force (deformation load) that acts to cause the touch panel sensor 103 and the liquid crystal panel 110 to be restored from its curved shape to a flat shape.

Any detection mode such as resistive film mode, capacitive mode, or ultrasonic surface acoustic wave mode may be used as the detection mode for the touch panel sensor 103, for example. The touch panel sensor 103 may be a touch panel sensor substrate (with a thickness of 0.5 mm to 1 mm, for example) including a touch panel sensor layer and a fixing substrate (such as a glass substrate), or may be a touch panel sensor film that does not include a fixing substrate.

Figure 10:
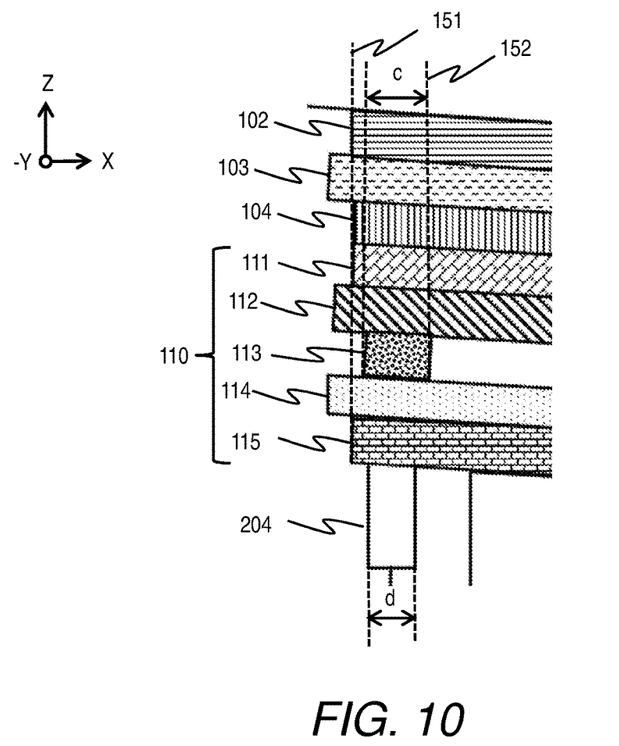
FIG. 10 illustrates a partial expanded view of an example of section A in FIG. 9.

FIG. 10 illustrates a partial expanded view of an example of section A in FIG. 9. The dotted line 151 indicates the edge in the negative X axis direction of the first adhesive layer 102, the second adhesive layer 104, the CF polarizing plate 111, and the TFT polarizing plate 115. The edge indicated by the dotted line 151 is located further to the outside than the inner circumferential edge of the seal 113 in relation to the center of the screen of the liquid crystal panel 110. The pressing force by the pressure members 203 is transmitted to the front cover 101 via the liquid crystal panel 110 and the touch panel sensor 103. Along the positive Z axis direction of the contact member 204, at least the front cover 101, the first adhesive layer 102, the touch panel sensor 103, the second adhesive layer 104, the CF substrate 112, and the TFT substrate 114 are disposed.

As described above, the display device 10 of the present embodiment includes the touch panel sensor 103, and can maintain the liquid crystal panel 110 and the touch panel sensor 103 in a curved state.

Embodiment 3

Differences from the display device 10 of Embodiment 2 will be described. The display device 10 of the present embodiment includes rear chassis, and one end of the pressure member 203 and the touch panel sensor 103 are fixed to the rear chassis.

Figure 11:
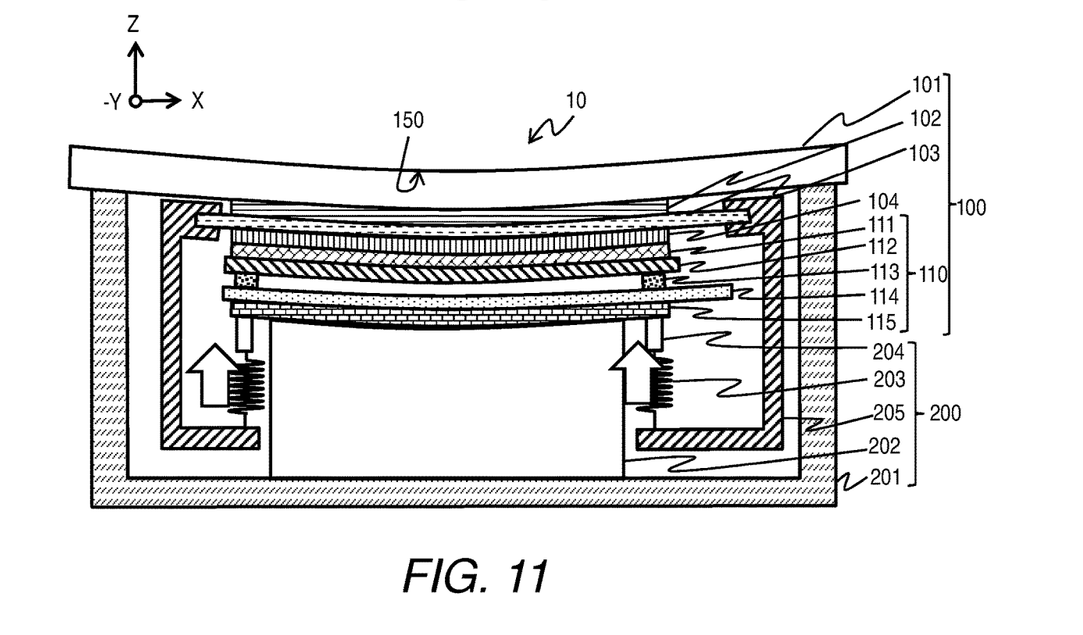
FIG. 11 is a cross-sectional view illustrating an example of cross section of the display device along the line A-A' of FIG. 1 according to Embodiment 3.

FIG. 11 is a cross-sectional view illustrating an example of cross section of the display device 10 along the line A-A' of FIG. 1. The rear unit 200 includes one or more rear chassis 205. Each rear chassis 205 is disposed to the outside of the backlight unit 202 in a plane parallel to the XY plane and is accommodated in the backlight chassis 201. The rear chassis 205 are made of stainless steel or the like, for example.

The positive Z axis direction end of each rear chassis 205 is joined to the positive or negative Z axis direction end of the touch panel sensor 103 (so as to hold the touch panel sensor 103 in place using the rear chassis 205 as a clip in the example of FIG. 11). The negative Z axis direction end of each rear chassis 205 is connected to the negative Z axis direction end of the pressure member 203 and supports the pressing force of the pressure member 203.

In the present embodiment, the rear chassis 205 function as fixing chassis that fix the pressure members 203 in place, and the touch panel sensor 103 functions as a support plate that supports the rear chassis 205, which are the fixing chassis. The support plate that supports the rear chassis 205, or in other words, the member to which the positive Z axis direction ends of the rear chassis 205 are to be joined may be a member other than the touch panel sensor 103 as long as the member has a high degree of rigidity, and is positioned in an upper layer (i.e., the positive Z axis direction) than the contact members 204.

The two rear chassis 205 in FIG. 11 may be integrated to each other on the outside of the backlight unit 202 along at least one of the positive Y axis direction and the negative Y axis direction. In other words, in such a case, the rear unit 200 only includes one rear chassis 205.

In order to support the rear chassis 205 as previously mentioned, it is preferable that the touch panel sensor 103 of the present embodiment be a touch panel sensor substrate that includes a fixing substrate (such as a glass substrate) instead of being a touch panel sensor film that does not include a fixing substrate.

In manufacturing the display device 10 of the present embodiment, a step in which, in assembling the front unit 100, the liquid crystal panel 110 having bonded thereto the touch panel sensor 103 is bonded to the front cover 101 on which the first adhesive layer 102 is applied, is executed separately from a step of integrating the pressure members 203, the contact members 204, and the rear chassis 205. Next, the integrated pressure member 203, contact members 204, and rear chassis 205 are pressed onto and bonded to the front unit 100, and then, the backlight unit 202 and the backlight chassis 201 are integrated to each other and additionally bonded thereto.

Embodiment 4

Differences from the display device 10 of Embodiment 3 will be described. The rear chassis 205 of the display device 10 of the present embodiment is fixed to one end of the pressure member 203 and the front cover 101.

Figure 12:
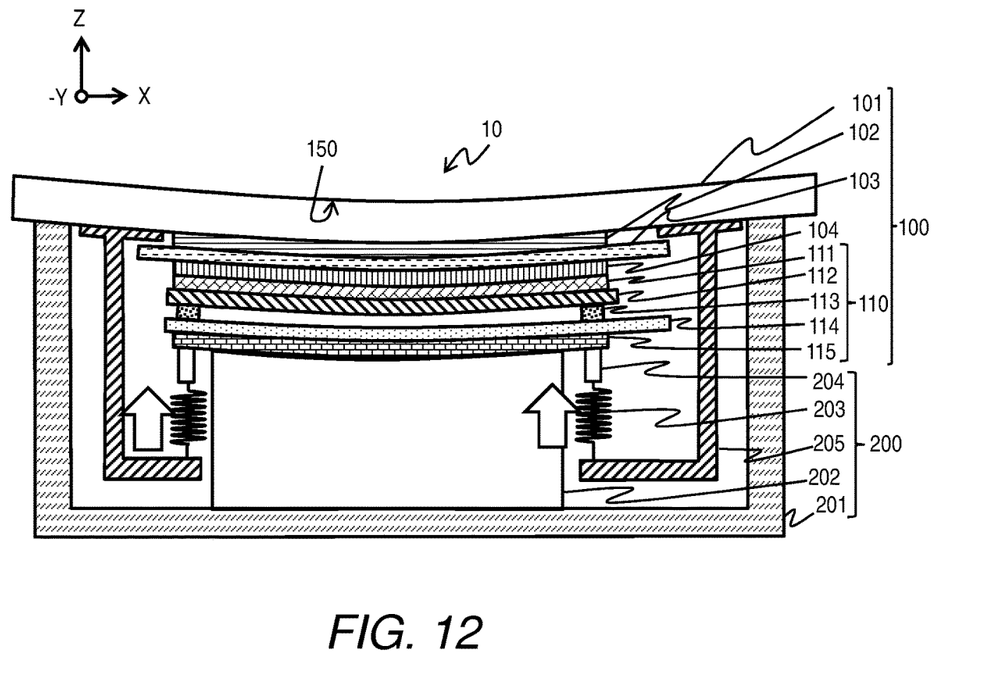
FIG. 12 is a cross-sectional view illustrating an example of cross section of the display device along the line A-A' of FIG. 1 according to Embodiment 4.

FIG. 12 is a cross-sectional view illustrating an example of cross section of the display device 10 along the line A-A' of FIG. 1. The positive Z axis direction ends of the rear chassis 205 function as clampers that are joined to the surface of the front cover 101 opposite to the surface 150. The negative Z axis direction end of each rear chassis 205 is connected to the negative Z axis direction end of the pressure member 203 and supports the pressing force of the pressure member 203.

In the present embodiment, the rear chassis 205 function as fixing chassis that fix the pressure members 203 in place, and the front cover 101 functions as a support plate that supports the rear chassis 205, which are the fixing chassis. The touch panel sensor 103 may be a touch panel sensor substrate including a fixing substrate (such as a glass substrate), or may be a touch panel sensor film that does not include a fixing substrate.

In manufacturing the display device 10 of the present embodiment, the liquid crystal panel 110 having bonded thereto the touch panel sensor 103 is bonded to the front cover 101 on which the first adhesive layer 102 is applied, to assemble the front unit 100, the rear chassis 205 are pressed and bonded thereto, and then the backlight unit 202 and the backlight chassis 201 are integrated together and additionally bonded.

As set forth above, embodiments of this invention have been described; however, this invention is not limited to the foregoing embodiments. Those skilled in the art can easily modify, add, or convert each element in the foregoing embodiment within the scope of this invention. A part of the configuration of one embodiment can be replaced with a configuration of another embodiment or a configuration of an embodiment can be incorporated into a configuration of another embodiment.

What is claimed is:

1. A display device, comprising:
    a liquid crystal panel having a first surface including a display region and a second surface opposite to the first surface, as curved surfaces that are curved in a first direction;
    a contact member that is attached to the second surface of the liquid crystal panel;
    a pressure member comprising at least one of a spring or a compressed elastomer,
    wherein the pressure member is attached to the contact member, and applies a pressing force to the liquid crystal panel, the pressing force countering an elastic force that acts to restore the liquid crystal panel as a flat plate;
    a fixing chassis that fixes the pressure member at a position opposing the contact member; and
    a support member that supports the fixing chassis,
    wherein the liquid crystal panel includes a seal that traces an inner circumference of the curved surfaces and seals liquid crystal,
    wherein a contact region between the contact member and the liquid crystal panel is located inside of the seal along a third axis that is perpendicular to a first axis that defines a non-curved side of the curved surfaces, and to a second axis that defines the first direction,
    wherein the liquid crystal panel includes a TFT substrate,
    wherein the liquid crystal panel includes a color filter substrate that is disposed further towards the first surface than the TFT substrate,
    wherein the liquid crystal panel includes:
    a TFT polarizing plate that is attached to the second surface side of the TFT substrate; and
    a color filter polarizing plate that is attached to the first surface side of the color filter substrate, and
    wherein ends of the TFT polarizing plate and the color filter polarizing plate to an outside of the liquid crystal panel along the third axis are located to an outside of ends of the seal to the outside along the third axis.

2. The display device according to claim 1, further comprising:
    a backlight that is disposed on the second surface of the liquid crystal panel,
    wherein the fixing chassis is disposed in a vicinity of the backlight along at least one of the first axis and the second axis.

3. The display device according to claim 2, wherein the fixing chassis is a container that accommodates the liquid crystal panel, the contact member, the pressure member, and the backlight, and
    wherein the support member is located on the first surface of the liquid crystal panel,
    wherein the support member is attached to the fixing chassis, and
    wherein the support member covers an opening of the fixing chassis.

4. The display device according to claim 3, further comprising:
    a touch panel sensor that is sandwiched between the support member and the first surface of the liquid crystal panel.

5. The display device according to claim 2, further comprising:
    a touch panel sensor that is attached to the first surface of the liquid crystal panel,
    wherein the support member is the touch panel sensor.

6. The display device according to claim 5, further comprising:
    a backlight chassis that is a container that accommodates the liquid crystal panel, the contact member, the pressure member, the backlight, the fixing chassis, and the touch panel sensor; and
    a front cover that is located on the first surface of the liquid crystal panel, and that is attached to the backlight chassis,
    wherein the touch panel sensor is sandwiched between the front cover and the first surface of the liquid crystal panel.

7. The display device according to claim 2, further comprising:
    a front cover that is located on the first surface of the liquid crystal panel; and
    a touch panel sensor that is sandwiched between the front cover and the first surface of the liquid crystal panel,
    wherein the support member is the front cover.

8. The display device according to claim 7, further comprising:
    a backlight chassis that is a container that accommodates the liquid crystal panel, the contact member, the pressure member, the backlight, the fixing chassis, and the touch panel sensor,
    wherein the front cover is attached to the backlight chassis and covers an opening of the backlight chassis.

9. The display device according to claim 1, wherein the seal and a liquid crystal layer including the liquid crystal are sandwiched between the TFT substrate and the color filter substrate.

10. The display device according to claim 9, wherein the TFT substrate and the color filter substrate are disposed along a fourth axis that is parallel to the second axis that passes through the contact member.

11. The display device according to claim 1, wherein the TFT polarizing plate and the color filter polarizing plate are disposed along a fourth axis that is parallel to the second axis that passes through the contact member.

* * * * *